United States Patent [19]

Morooka

[11] Patent Number: 5,768,029
[45] Date of Patent: Jun. 16, 1998

[54] ZOOM LENS SYSTEM

[75] Inventor: Masaru Morooka, Machida, Japan

[73] Assignee: Olympus Optical Co., Ltd., Tokyo, Japan

[21] Appl. No.: 602,448

[22] Filed: Feb. 16, 1996

[30] Foreign Application Priority Data

Feb. 17, 1995 [JP] Japan ................................ 7-029443

[51] Int. Cl.[6] .............................. G02B 15/14; G02B 3/02
[52] U.S. Cl. .................................... 359/687; 359/708
[58] Field of Search .................................. 359/687, 682, 359/681, 774, 677, 708, 713–715

[56] References Cited

U.S. PATENT DOCUMENTS

| 4,240,700 | 12/1980 | Ogawa et al. | 359/677 |
|---|---|---|---|
| 4,348,082 | 9/1982 | Ogawa | 359/677 |
| 4,871,239 | 10/1989 | Matsumoto et al. | 359/690 |
| 4,917,482 | 4/1990 | Ito | 359/690 |
| 5,179,472 | 1/1993 | Ohno et al. | 359/687 |
| 5,247,393 | 9/1993 | Sugawara | 359/687 |
| 5,257,135 | 10/1993 | Kohno et al. | 359/689 |
| 5,285,316 | 2/1994 | Miyano et al. | 359/687 |
| 5,341,243 | 8/1994 | Okuyama | 359/687 |
| 5,543,969 | 8/1996 | Ito | 359/687 |

FOREIGN PATENT DOCUMENTS 6-34886  2/1994  Japan .

*Primary Examiner*—Georgia Y. Epps
*Assistant Examiner*—Jordan M. Schwartz
*Attorney, Agent, or Firm*—Cushman Darby & Cushman IP Group of Pillsbury Madison & Sutro LLP

[57] ABSTRACT

The invention relates to a positive lens group preceding type of compact zoom lens system for use on still cameras, in which the focal distance at the wide-angle end is shorter than the diagonal length of an image pickup surface, the angle of field is at least 64° at the wide-angle end and the zoom ratio is at least 3, and which comprises a first positive lens group G1, a second negative lens group G2, a third positive lens group G3 and a fourth positive lens group G4 so that the first, third and fourth lens groups G1, G3 and G4 are moved toward the object side for zooming from the wide-angle end to the telephoto end. The second lens group G2 comprises three lenses, the fourth lens group G4 comprises a positive lens component and a negative lens component, and the third and fourth lens groups G3 and G4 have at least two aspheric surfaces, with conditional inequality $0.1 < d_4/f_W < 0.5$ being satisfied, where $d_4$ is the air separation between the positive and negative lens components of said fourth lens group and $f_W$ is the composite focal distance of the overall system at the wide-angle end.

16 Claims, 4 Drawing Sheets

(Wide-angle end)

(Intermediate focal distance)

(Telephoto end)

(Wide-angle end)

(Intermediate focal distance)

(Telephoto end)

(Wide-angle end)

(Intermediate focal distance)

(Telephoto end)

(Wide-angle end)

(Intermediate focal distance)

(Telephoto end)

ZOOM LENS SYSTEM

BACKGROUND OF THE INVENTION

The present invention relates generally to a zoom lens, and more particularly to a zoom lens system suitable for use on still cameras, which has a zoom ratio of at least 3 and in which the focal length at the wide-angle end is shorter than the diagonal length of an image pickup surface.

Zoom lenses for use on recently developed function-intensive still and other cameras are increasingly required to be compact and have a zoom ratio high enough to enable a single lens to cover an area from the wide-angle end, having a wider angle of field, even to the telephoto end, having a long focal distance.

In general, zoom lenses are broken down into two types, one called a positive lens group preceding type (meaning that the foremost lens group has a positive refracting power) and the other a negative lens group preceding type (meaning that the foremost lens group has a negative refracting power). Of these two types, the negative lens group preceding type is beneficial for enlarging the angle of field at the wide-angle end. At a zoom ratio of 2 or more, however, there is an increase in the overall length of the lens system. Moreover, since light flux is diverged by the negative lens group, there is an increase in the diameter of the lens group(s) that follow. Thus, it is difficult to make a reasonable compromise between obtaining a high zoom ratio and making the lens diameters small.

The positive lens group preceding type, on the other hand, is inferior to the negative lens group preceding type in terms of enlarging the angle of field at the wide-angle end. Since light flux is converged by the positive lens group, however, this lens type enables the effective diameter of the lens group(s) that follow it to be decreased and a high zoom ratio can obtained. In this respect, it is superior to the former type.

In a positive lens group preceding type of zoom lens system containing a wide-angle area where the focal distance at the wide-angle end is shorter than the diagonal length of an image pickup surface, and has a zoom ratio of at least about 3, a strong negative refracting power is imparted to the second lens group thereof and a lens group or groups having a positive refracting power are located off the second lens group toward the image side. For zooming, it is general that separations between the first lens group having a positive refracting power and the second lens group having a negative refracting power and optionally a lens group or groups located off the second lens group toward the image side, are varied.

In order for the lens system of such a design to be used to obtain a high zoom ratio and reduce the total length and amount of movement of the lens groups during zooming, thereby achieving compactness, the refracting powers of the lens groups (especially that of the second lens group having a negative refracting power) must be increased.

In the zoom lens system containing a wide-angle area where the focal distance at the wide-angle end is shorter than the diagonal length of an image pickup surface and having a zoom ratio of at least about 3, the angle of field varies greatly between the wide-angle end and the telephoto end. Consequently, the second lens group is generally made up of three negative lenses and one positive lens to accommodate itself to a change of the angle of incidence of off-axis rays incident thereon, as disclosed in JP-A 63-66522, JP-A 63-66523, JP-A 63-294506, and U.S. Pat. No. 4,871,239.

JP-A 54-30855, JP-A 55-156912, JP-A 1-178912 and JP-A 6-34886 disclose examples of the positive lens group preceding type wherein the second lens groups having a negative refracting power are each made up of three lenses, negative, negative and positive in that order from the object side.

Furthermore, JP-A 4-317019 discloses an example of the positive lens group preceding type wherein at least three aspheric surfaces are used throughout the overall system to achieve reductions in the number of lenses, cost reductions and compactness while high optical properties are maintained.

In the zoom lens systems disclosed in JP-A 63-66522, JP-A 63-66523, JP-A 63-294506 and U.S. Pat. No. 4,871,239, each of the second lens groups having a negative refracting power is made up of a negative lens, a negative lens, a positive lens and a negative lens in that order from the object side, thereby accommodating itself to the strong negative refracting power and a change of the angle of incidence of off-axis rays. However, these lens designs are still less than satisfactory in terms of cost and size because as many as four lenses are used for the second lens groups.

Some of the above-mentioned publications disclose examples wherein an aspheric surface is introduced in the second lens groups having a negative refracting power for the purpose of correcting for distortion and the second lens groups are all made up of four lenses. However, these references teach how to reduce the number of lenses to three or less.

Moreover, JP-A 54-30855, JP-A 55-156912 and JP-A 1-178912 refer to examples of the positive lens group preceding type wherein the second lens groups having a negative refracting power are each made up of three lenses, negative, negative and positive in that order from the object side. However, they have the problems that high zoom ratios are not achievable and the total lengths of the second lens groups consisting of three lenses are too long, and so are less than satisfactory regarding a high zoom ratio and compactness.

JP-A 6-34886 further discloses an example of the positive lens group preceding type with a zoom ratio of about 3.7, wherein the second lens group has a negative refracting power and is made up of a negative lens, a negative lens and a positive lens in that order from the object side. However, a wide enough angle of field is not achievable at the wide-angle end, as can be understood from the exemplified angle of field of as small as about 64° at the wide-angle end.

JP-A 4-317019 further discloses that at least three aspheric surfaces are used throughout the overall system to reduce the number of lenses constituting each lens group to three or less. However, the zoom ratio exemplified there is 3 at most and so is still unsatisfactory.

SUMMARY OF THE INVENTION

In view of the above problems with the prior art devices, it is therefore an object of the present invention to provide a positive lens group preceding type of zoom lens system including a second lens group having a negative refracting power and consisting of three lenses, wherein an aspheric surface or surfaces are effectively used, so that while high optical properties are maintained, the number of lenses involved can be reduced to achieve cost reductions and compactness. In this zoom lens system, the focal distance at the wide-angle end is shorter than the diagonal length of an image pickup surface and, in particular, the angle of field at the wide-angle end is at least 64° while the zoom ratio is at least 3, with well-corrected aberrations.

According to a first aspect of the present invention, the above-mentioned object is achieved by providing a zoom lens system with a focal distance at the wide-angle end which is shorter than the diagonal length of an image pickup surface. The zoom lens system according to this aspect of the invention comprises, in order from the object side, a first lens group having a positive refracting power, a second lens group having a negative refracting power, a third lens group having a positive refracting power and a fourth lens group having a positive refracting power wherein the first, third and fourth lens groups are moved toward the object side for zooming from the wide-angle end to the telephoto end. The zoom lens system is characterized in that said second lens group comprises three lenses, said fourth lens group comprises, in order from the object side, a positive lens component and a negative lens component, and said third and fourth lens groups have at least two aspheric surfaces. It is further characterized by conforming to the following conditional inequality:

$$0.1 < d_4/f_W < 0.5 \quad (1)$$

where $d_4$ is the air separation between the positive and negative lens components of said fourth lens group and $f_W$ is the composite focal distance of the overall system at the wide-angle end.

According to a second aspect of the present invention, a zoom lens system with the focal distance at the wide-angle end being shorter than the diagonal length of an image pickup surface is provided. The zoom lens system according to this aspect of the invention comprises, in order from the object side, a first lens group having a positive refracting power, a second lens group having a negative refracting power, a third lens group having a positive refracting power and a fourth lens group having a positive refracting power wherein the first, third and fourth lens groups are moved toward the object side for zooming from the wide-angle end to the telephoto end. The zoom lens system is characterized in that each of said lens groups comprises up to three lenses, said fourth lens group comprises, in order from the object side, a positive lens component and a negative lens component, and said third and fourth lens groups have at least two aspheric surfaces. It is further characterized by conforming to the following conditional inequality:

$$0.1 < d_4/f_W < 0.5 \quad (1)$$

where $d_4$ is the air separation between the positive and negative lens components of said fourth lens group and $f_W$ is the composite focal distance of the overall system at the wide-angle end.

According to a third aspect of the present invention, a zoom lens system with the focal distance at the wide-angle end being shorter than the diagonal length of an image pickup surface is provided. The zoom lens system according to this aspect of the invention comprises, in order from the object side, a first lens group having a positive refracting power, a second lens group having a negative refracting power, a third lens group having a positive refracting power and a fourth lens group having a positive refracting power wherein the first, third and fourth lens groups are moved toward the object side for zooming from the wide-angle end to the telephoto end. The zoom lens system is characterized in that said second lens group comprises three lenses, and said third and fourth lens groups have at least two aspheric surfaces. It is further characterized in that said first and second lens groups are moved together for focusing.

According to a fourth aspect of the present invention, a zoom lens system with the focal distance at the wide-angle end being shorter than the diagonal length of an image pickup surface is provided. The zoom lens system according to this aspect of the invention comprises, in order from he object side, a first lens group having a positive refracting power, a second lens group having a negative refracting power, a third lens group having a positive refracting power and a fourth lens group having a positive refracting power wherein the first, third and fourth lens groups are moved toward the object side for zooming from the wide-angle end to the telephoto end. The zoom lens system is characterized in that said second lens group comprises, in order from the object side, a negative meniscus lens convex on the object side, a double-concave lens with the object-side surface having a stronger curvature, and a double-convex lens with the object-side surface having a stronger curvature. The third lens group consists essentially of, in order from the object side, a double-convex lens with the object-side surface having a stronger curvature, a positive lens with the object-side surface having a stronger curvature and a negative meniscus lens convex on the image side. The fourth lens group comprises a positive lens component and a negative lens component in order from the object side, said negative lens component comprises a negative lens with the image-side surface concave on the image side, and said third and fourth lens groups have at least two aspheric surfaces.

A detailed account will now be given of why the above-mentioned arrangements are used and how they act.

Generally, to the positive lens group preceding type of zoom lens system such as one according to the present invention which covers from a wide-angle area having a wider angle of field to a telephoto area having a longer focal distance (i.e.,); contains a wide-angle end area where the focal distance is shorter than the diagonal length of an image pickup surface, and has a zoom ratio of at least about 3, overall constitutes a retrofocus type at the wide-angle end where the second lens group is closest to the first lens group and a telephoto type at the telephoto end where the second lens group is farthest from the first lens group. Here the problem that must be solved to make the angle of field wider at the wide-angle end and achieve a higher zoom ratio as well as to make the overall length of the lens system from the wide-angle end shorter to the telephoto end is how efficiently the refracting power of the second negative lens group is increased. However, if the refracting power of the second negative lens group were to be increased to make the angle of field at the wide-angle end wide and make the zoom ratio of the lens system high simultaneously with achieving compactness, various aberrations produced by the second lens group would become too large. In addition, the negative Petzval sum of the lens system would increase overall, resulting in the tilting of field toward the image side. Cost reductions may be achieved by reducing the number of lenses forming the second lens group, but this becomes a barrier to correcting for various aberrations.

The above-mentioned object is achieved by the first embodiment of the present invention, according to which a zoom lens system with the focal distance at the wide-angle end being shorter than the diagonal length of an image pickup surface is provided. The zoom lens system according to this aspect of the invention comprises, in order from the object side, a first lens group having a positive refracting power, a second lens group having a negative refracting power, a third lens group having a positive refracting power and a fourth lens group having a positive refracting power and in which the first, third and fourth lens groups are moved toward the object side for zooming from the wide-angle end to the telephoto end. The zoom lens system is characterized in that said second lens group comprises three lenses, said fourth lens group comprises, in order from the object side, a positive lens component and a negative lens component. The third and fourth lens groups have at least two aspheric surfaces, and are further characterized by conforming to the following conditional inequality:

$$0.1 < d_4/f_w < 0.5 \tag{1}$$

where $d_4$ is the air separation between the positive and negative lens components of said fourth lens group and $f_w$ is the composite focal distance of the overall system at the wide-angle end. The refracting power of the second negative lens group is increased, especially to make the zoom ratio of the positive lens group preceding type of zoom lens system high and to make the angle of field thereof at the wide-angle end wide. However, if the number of lenses forming the second lens group were to be reduced from four (as conventional) to three, it would be difficult to make satisfactory correction for various aberrations over the total focal distance area. It is therefore desired to make satisfactory correction for spherical aberration over the total focal distance area by use of at least one aspheric surface for the surface of the third and fourth lens group that is relatively close to a stop and to make satisfactory correction for curvature of field and coma by use of at least one aspheric surface for the lens group that is relatively close to the image surface.

Conditional inequality (1) is given to limit a lowering of the aberration performance of the fourth lens group with respect to decentering. If the upper limit of 0.5 is exceeded, the lens diameter of the fourth lens group increases, thus making it difficult to make the overall lens system compact, although the lowering of the aberration performance of the fourth lens group with respect to decentering may be limited.

If the lower limit of 0.1 is not reached, it is difficult for the overall system to maintain satisfactory aberration performance while the lowering of the aberration performance with respect to decentering is limited.

The second embodiment of the zoom lens system according to the present invention comprises, in order from the object side, a first lens group having a positive refracting power, a second lens group having a negative refracting power, a third lens group having a positive refracting power and a fourth lens group having a positive refracting power wherein the first, third and fourth lens groups are moved toward the object side for zooming from the wide-angle end to the telephoto end. The zoom lens system is characterized in that each of said lens groups comprises up to three lenses. The fourth lens group comprises a positive lens component, and a negative lens component in that order from the objet side, and said second, third and fourth lens groups have at least two aspheric surfaces, and are further characterized by conforming to the above-mentioned conditional inequality (1).

The refracting powers of the following lens groups would increase, especially if the refracting power of the second lens group were to be increased so as to make the zoom ratio of the lens system high simultaneously with making the angle of field thereof at the wide-angle end wide. If the number of lenses forming each lens group were to be not more than three, on the other hand, it would be difficult to make satisfactory correction for various aberrations over the total focal distance area. To achieve cost reductions and compactness while the number of lenses forming each lens groups is reduced to three or less, it is therefore desired to make satisfactory correction for spherical aberration over the total focal distance area by use of at least one aspheric surface for the surface of the third and fourth lens groups that is relatively close to the stop and make satisfactory correction for curvature of field and coma over the total focal distance area, while higher-order aberrations produced by the second lens group and those produced by the following lens groups are in a well-balanced state, by use of at least one aspheric surface for the surface of the third and fourth lens groups that is relatively close to the image side. By conforming to conditional inequality (1) it is possible to limit the lowering of the aberration performance of the fourth lens group with respect to decentering.

The third embodiment of the zoom lens system according to the present invention comprises, in order from the object side, a first lens group having a positive refracting power, a second lens group having a negative refracting power, a third lens group having a positive refracting power and a fourth lens group having a positive refracting power wherein the first, third and fourth lens groups are moved toward the object side for zooming from the wide-angle end to the telephoto end. The zoom lens system is characterized in that said second lens group comprises three lenses, and said third and fourth lens groups have at least two aspheric surfaces. Furthermore, the zoom lens system is characterized in that said first and second lens groups are moved together for focusing.

According to the third embodiment of the present invention, compactness is achieved by reducing the number of lenses involved while higher zoom ratios and wider angles of field are achieved, as already mentioned. Moreover, the above-mentioned focusing mechanism is suitable for reducing the shortest object distance during focusing while achieving compactness.

In a prior art positive lens group preceding type of zoom lens system in particular, focusing is done by drawing out the front lens. This focusing mechanism is advantageous in that the amount of the front lens to be drawn out is kept constant irrespective of the zooming position but, with this, it is impossible to reduce a near-by object distance because, upon the front lens being drawn out, an off-axis bundle is shaded by the amount that the front lens is drawn out, resulting in a drop of off-axis field illuminance. If the diameter of the front lens were to be increased so as to prevent the shading of the off-axis bundle, the lens system would increase in size.

In the present invention, the first and second lens groups are moved together toward the object side for focusing from an infinite object distance to a near-by object distance. With this focusing mechanism it is possible to reduce the amount of focusing movement, because the composite refracting power of the first and second lens groups is larger than that of the front lens (the first lens group). This in turn enables the near-by object distance to be reduced and in particular, makes it possible to reduce the amount of focusing movement at the wide-angle end; so the front lens can be much more reduced in diameter.

This focusing mechanism is also beneficial to correcting for aberrations during focusing from the point at infinity to a near-by object distance, because variations of spherical aberration and curvature of field are limited. In other words, when focusing is done by drawing out the front lens from a focusing state, where spherical aberration and curvature of field are corrected for the object point at infinity, with respect to a near-by object point, the spherical aberration and the curvature of field vary in opposite directions. According to the above-mentioned focusing mechanism involving the integral movement of the first and second lens groups, both the spherical aberration and the curvature of field vary in the same direction even when focusing is done from the focusing state, where such aberrations are corrected for the object point at infinity, with respect to a near-by object point. This is beneficial to correction of aberrations, and is advantageous for reducing the near-by object distance as well.

According to the fourth embodiment of the present invention, a zoom lens system with the focal distance at the wide-angle end being shorter than the diagonal length of an image pickup surface is provided. The zoom lens system according to this aspect of the invention comprises, in order from the object side, a first lens group having a positive refracting power, a second lens group having a negative refracting power, a third lens group having a positive refracting power and a fourth lens group having a positive refracting power wherein the first, third and fourth lens groups are moved toward the object side for zooming from the wide-angle end to the telephoto end. The zoom lens system is characterized in that said second lens group comprises, in order from the object side, a negative meniscus lens convex on the object side, a double-concave lens with the object-side surface having a stronger curvature, and a double-convex lens with the object-side surface having a stronger curvature. The third lens group comprises, in order from the object side, a double-convex lens with the object-side surface having a stronger curvature, a positive lens with the object-side surface having a stronger curvature and a negative meniscus lens convex on the image side. The fourth lens group comprises a positive lens component and a negative lens component in order from the object side, said negative lens component comprises a negative lens with the image-side surface concave on the image side, and said third and fourth lens groups have at least two aspheric surfaces.

According to this embodiment of the present invention, compactness is achieved while higher zoom ratios and wider angles of field are accomplished, and satisfactory aberration performance is obtained for the overall lens system.

Furthermore, the zoom lens system according to the present invention is characterized by conforming to the following inequalities:

$$-0.33 < f_{12W}/f_T < -0.1 \quad (2)$$

$$0.01 < \Delta d_3/f_W < 0.35 \quad (3)$$

$$-0.33 < f_{12W}/f_T < -0.2 \quad (2')$$

$$0.01 < \Delta d_3/f_W < 0.25 \quad (3')$$

Here $f_{12W}$ is the composite focal distance of the first and second lens groups at the wide-angle end, $f_T$ is the composite focal distance of the overall lens system at the telephoto end, $\Delta d_3$ is the value found by subtracting the air separation between the third and fourth lens groups at the telephoto end from the air separation between the third and fourth lens groups at the wide-angle end, and $f_W$ is the composite focal distance of the overall lens system at the wide-angle end.

Conditional inequality (2) is given to limit the total length of the lens system at the wide-angle end. At the wide-angle end where the first and second lens groups are closest to each other, they constitute, overall, a retrofocus type of front lens group having a negative refracting power. When the lower limit of inequality (2) does not reach −0.33, the composite refracting power of the first and second lens groups which overall yield a negative refracting power becomes too small to make the lens system compact. When the upper limit of −0.1 is exceeded, the composite refracting power of the first and second lens groups becomes too large to correct for aberrations produced there, in particular, negative distortion at the wide-angle end.

To reduce the total length of the lens system at the wide-angle end, it is further advantageous to satisfy conditional inequality (2').

Conditional inequality (3) is set down to make satisfactory correction for curvature of field over the total zooming area. Falling below the lower limit of 0.01 is not preferable because the image surface tilts largely in the positive direction during zooming from the wide-angle end to the telephoto end. Exceeding the upper limit of 0.35 is again not preferable because the image surface tilts largely in the negative direction. There is also an increase in the separation between the third and fourth lens groups, which is in turn disadvantageous for making the total length of the lens system compact.

To make more satisfactory correction for curvature of field over the total zooming area, it is further advantageous to satisfy inequality (3').

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

DESCRIPTION OF THE PREFERRED EMBODIMENTS

Examples 1–4 of the zoom lens system according to the present invention will now be explained with reference to the drawings.

FIGS. 1A to 4C illustrate, in section, four arrangements of the lens groups of Examples 1 to 4 at the wide-angle end, an intermediate focal distance, and the telephoto end.

Figure 1A:
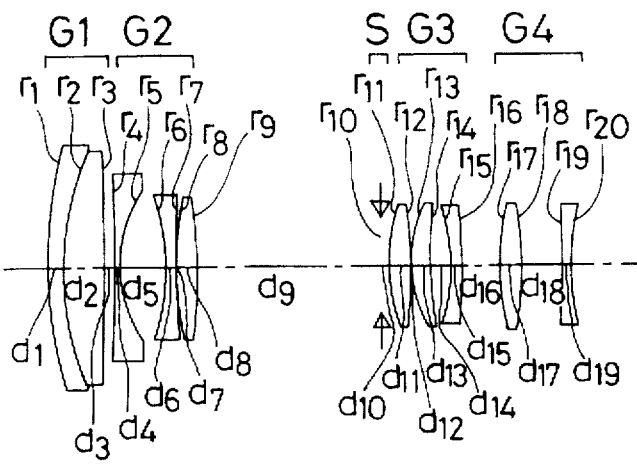
FIGS. 1A–1C are sectional views of one lens group arrangement of the zoom lens system of Example 1 according to the present invention at the wide-angle end, an intermediate focal distance, and the telephoto end, respectively
Figure 1B:
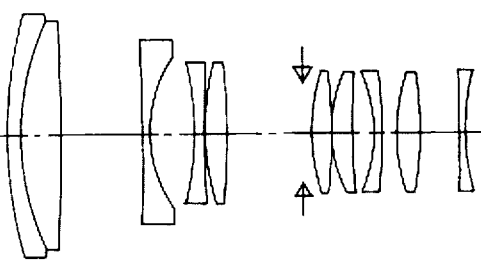
Figure 1C:
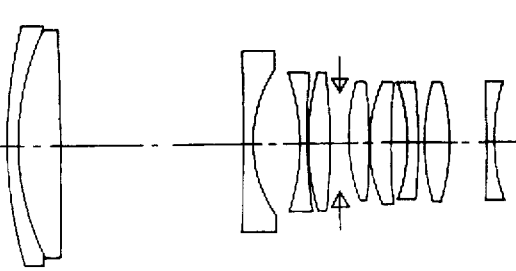

In regard to Example 1 as shown in FIGS. 1A–1C, the zoom lens system is made up of, in order from the object side, a first lens group G1 that is a doublet consisting of a negative meniscus lens concave on the image side and a positive meniscus lens convex on the object side, a second lens group G2 consisting of a negative meniscus lens concave on the image side, a double-concave negative lens and a double-convex positive lens, a stop S, a third lens group G3 consisting of a double-convex positive lens, a positive meniscus lens convex on the object side and a negative meniscus lens convex on the image side, and a fourth lens group G4 consisting of a double-convex positive lens and a negative meniscus lens concave on the image side. It is here to be noted that the object-side surface of the double-convex lens in the third lens group G3 and the object-side surface of the negative meniscus lens concave on the image side, incorporated in the fourth lens group G4, are aspheric.

Figure 2A:
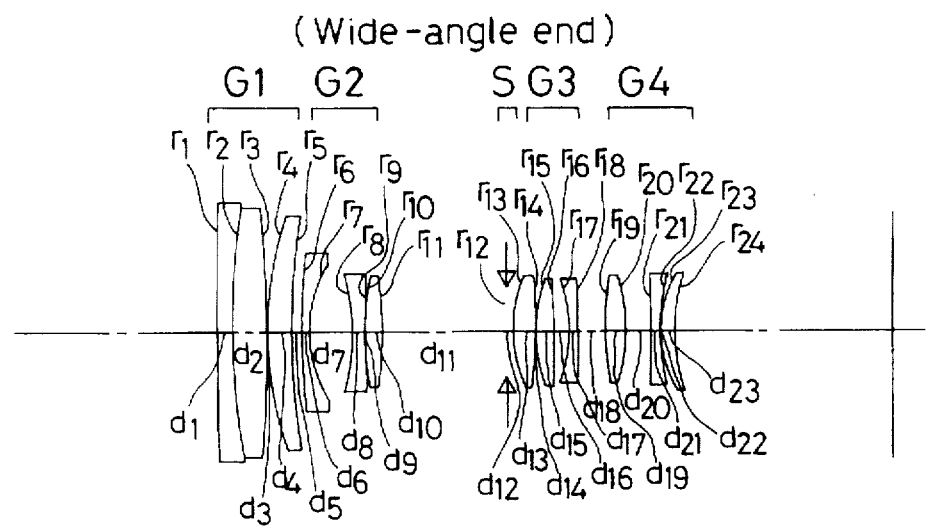
FIGS. 2A–2C are sectional views, similar to FIGS. 1A–1C, of the zoom lens system of Example 2 according to the present invention.
Figure 2B:
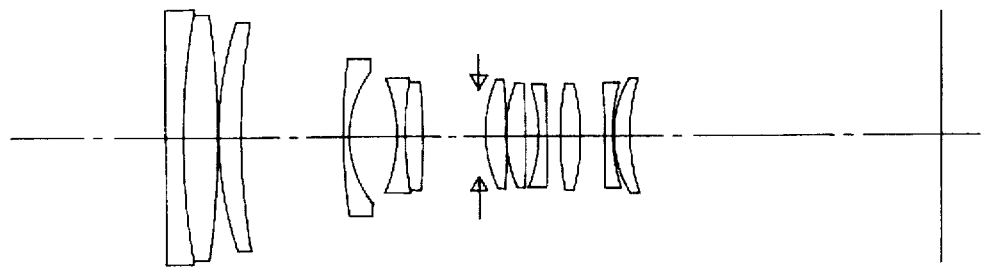
Figure 2C:
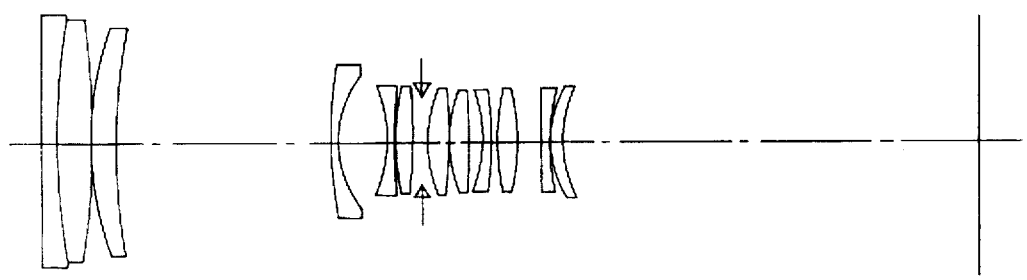

In regard to Example 2 as shown in FIGS. 2A–2C, the zoom lens system is made up of, in order from the object side, a first lens group G1 consisting of a doublet of a plano-concave lens concave on the image side and a double-convex positive lens, and a positive meniscus lens convex on the object side, a second lens group G2 consisting of a negative meniscus lens concave on the image side, a double-concave negative lens and a double-convex positive lens, a stop S, a third lens group G3 consisting of a double-convex positive lens, a positive meniscus lens convex on the object side and a negative meniscus lens convex on the image side, and a fourth lens group G4 consisting of a double-convex positive lens, a negative meniscus lens concave on the image side and a positive meniscus lens convex on the object side. It is here to be noted that the object-side surface of the double-convex lens in the third lens group G3 and the object-side surface of the negative meniscus lens concave on the image side, incorporated in the fourth lens group G4, are aspheric.

Figure 3A:
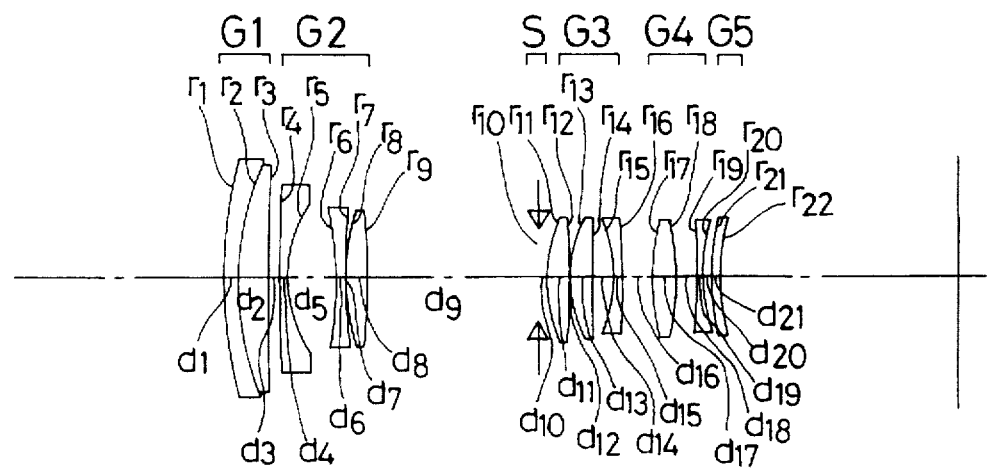
FIGS. 3A–3C are sectional views, similar to FIG. 1, of the zoom lens system of Example 3 according to the present invention.
Figure 3B:
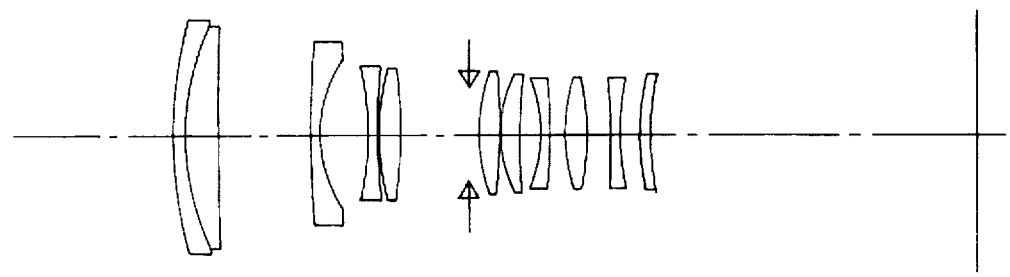
Figure 3C:
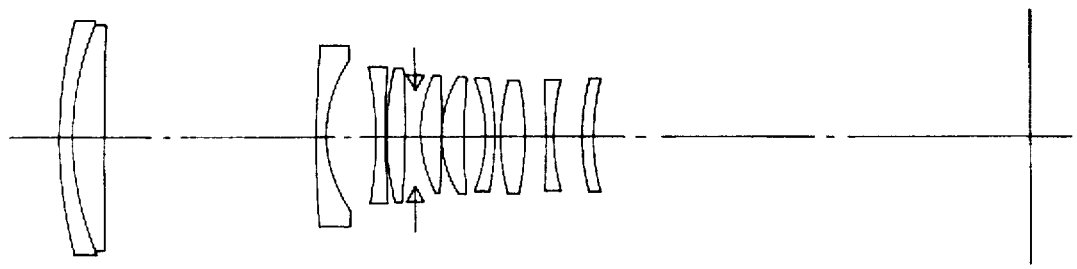

In regard to Example 3 as shown in FIGS. 3A–3C, the zoom lens system is made up of, in order from the object side, a first lens group G1 consisting of a doublet of a negative meniscus lens concave on the image side and a positive meniscus lens convex on the object side, a second lens group G2 consisting of a negative meniscus lens concave on the image side, a double-concave negative lens and a double-convex positive lens, a stop S, a third lens group G3 consisting of a double-convex positive lens, a positive meniscus lens convex on the object side and a negative meniscus lens convex on the image side, a fourth lens group G4 consisting of a double-convex positive lens and a double-concave negative lens, and a fifth lens group G5 consisting of a negative meniscus lens concave on the image side. It is here to be noted that the object-side surface of the double-convex lens in the third lens group G3 and the object-side surface of the double-concave negative lens in the fourth lens group G4 are aspheric.

Figure 4A:
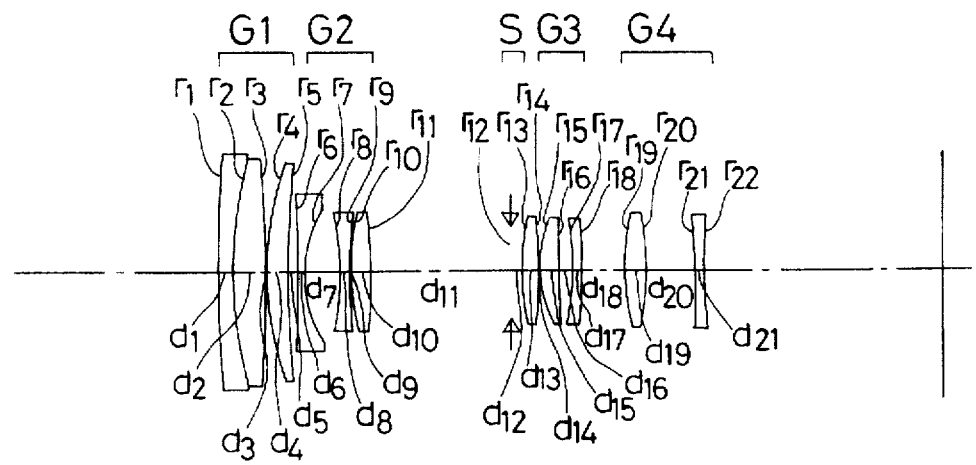
FIGS. 4A–4C are sectional views, similar to FIGS. 1A–1C, of the zoom lens system of Example 4 according to the present invention.
Figure 4B:
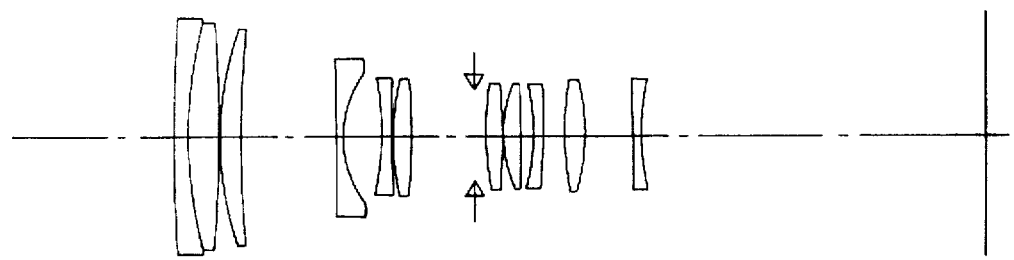
Figure 4C:
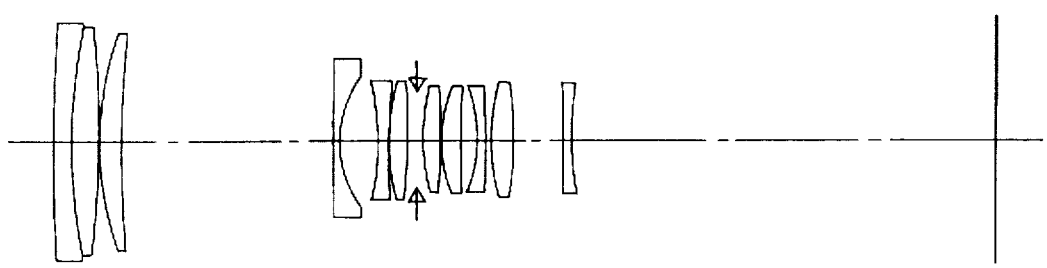

Finally, in regard to Example 4 as shown in FIGS. 4A–4C, the zoom lens system is made up of, in order from the object side, a first lens group G1 consisting of a doublet of a negative meniscus lens concave on the image side and a double-convex positive lens, and a positive meniscus lens convex on the object side, a second lens group G2 consisting of a negative meniscus lens concave on the image side, a double-concave negative lens and a double-convex positive lens, a stop S, a third lens group G3 consisting of a double-convex positive lens, a positive meniscus lens convex on the object side and a negative meniscus lens convex on the image side, and a fourth lens group G4 consisting of a double-convex positive lens and a plano-concave negative lens. It is here to be noted that the object-side surface of the double-convex positive lens in the third lens group G3 and the object-side surface of the negative lens in the fourth lens group G4 are aspheric.

In each example, focusing is done by drawing out the first and second lens groups G1 and G2 toward the object side as an integral piece.

Set out below are numerical data on each example. Symbols used hereinafter defined but not hereinbefore mean:

$F_{NO}$ F-number,
$f_B$ Back focus
$2\omega$ Angle of field
$r_1, r_2$, Radius of curvature of each lens surface
$d_1, d_2$, Separation between respective lens surfaces
$n_{d1}, n_{d2}$, d-line index of refraction of each lens,
$\nu_{d1}, \nu_{d2}$, Abbe's number of each lens Now let x and y denote the direction of propagation of light on the optical axis and the direction perpendicular to the optical axis, respectively. Then, aspheric configuration is given by:

$$x=(y^2/r)/[1+\{1-(y/r)^2\}^{1/2}]+A_4y^4+A_6y^6+A_8y^8+A_{10}y^{10}+A_{12}y^{12}$$

where r is the paraxial radius of curvature, and $A_4$, $A_6$, $A_8$, $A_{10}$ and $A_{12}$ are the 4th, 6th, 8th, 10th and 12th aspherical coefficients. In each example, the diagonal length of the image pickup surface is 34.6 mm.

| Example 1 |
|---| f = 25.1 ~ 50.0 ~ 99.9
$F_{NO}$ = 4.52 ~ 5.10 ~ 5.60
$f_B$ = R ~ 31.983 ~ 47.513 ~ 64.991
2 ω= 71.96° ~ 37.04° ~ 18.92°

| | | | |
|---|---|---|---|
| $r_1$ = 61.4439 | $d_1$ = 2.000 | $n_{d1}$ = 1.84666 | $\nu_{d1}$ = 23.78 |
| $r_2$ = 39.2527 | $d_2$ = 5.924 | $n_{d2}$ = 1.72916 | $\nu_{d2}$ = 54.68 |
| $r_3$ = 2220.0625 | $d_3$ = (Variable) | | |
| $r_4$ = 2485.2879 | $d_4$ = 1.200 | $n_{d3}$ = 1.77250 | $\nu_{d3}$ = 49.60 |
| $r_5$ = 18.2763 | $d_5$ = 6.573 | | |
| $r_6$ = −32.8877 | $d_6$ = 1.200 | $n_{d4}$ = 1.77250 | $\nu_{d4}$ = 49.60 |
| $r_7$ = 88.2173 | $d_7$ = 0.200 | | |
| $r_8$ = 45.9271 | $d_8$ = 2.903 | $n_{d5}$ = 1.84666 | $\nu_{d5}$ = 23.78 |
| $r_9$ = −93.1287 | $d_9$ = (Variable) | | |
| $r_{10}$ = (Stop) | $d_{10}$ = 1.000 | | |
| $r_{11}$ = 28.9392(Aspheric) | $d_{11}$ = 3.075 | $n_{d6}$ = 1.51633 | $\nu_{d6}$ = 64.15 |
| $r_{12}$ = −102.6988 | $d_{12}$ = 0.200 | | |
| $r_{13}$ = 20.1059 | $d_{13}$ = 2.892 | $n_{d7}$ = 1.48749 | $\nu_{d7}$ = 70.21 |
| $r_{14}$ = 95.0748 | $d_{14}$ = 2.884 | | |
| $r_{15}$ = −22.5250 | $d_{15}$ = 1.200 | $n_{d8}$ = 1.84666 | $\nu_{d8}$ = 23.78 |
| $r_{16}$ = −84.5711 | $d_{16}$ = (Variable) | | |
| $r_{17}$ = 32.9624 | $d_{17}$ = 3.288 | $n_{d9}$ = 1.65844 | $\nu_{d9}$ = 50.86 |
| $r_{18}$ = −47.3011 | $d_{18}$ = 5.535 | | |
| $r_{19}$ = 158.6571(Aspheric) | $d_{19}$ = 1.200 | $n_{d10}$ = 1.77250 | $\nu_{d10}$ = 49.60 |
| $r_{20}$ = 29.7141 | | | |

-continued

Zooming Spaces

| f | 25.1 | 50.0 | 99.9 |
|---|---|---|---|
| $d_3$ | 1.0709 | 11.5645 | 26.3321 |
| $d_9$ | 26.6226 | 10.9719 | 1.4517 |
| $d_{16}$ | 5.4703 | 2.2374 | 0.9673 |

Aspherical Coefficients

11th surface $A_4 = 0.17242 \times 10^{-4}$
$A_6 = 0.40330 \times 10^{-7}$
$A_8 = 0.37834 \times 10^{-9}$
$A_{10} = 0.16198 \times 10^{-13}$
$A_{12} = 0$

19th surface $A_4 = 0.60612 \times 10^{-4}$
$A_6 = 0.22036 \times 10^{-6}$
$A_8 = 0.11638 \times 10^{-8}$
$A_{10} = 0.95002 \times 10^{-11}$
$A_{12} = 0$ (1) $d_4/f_w = 0.22$
(2) $f_{12w}/f_T = 0.31$
(3) $A\Delta d_3 /f_w = 0.18$

Example 2

$f = 25.3 \sim 50.0 \sim 99.8$
$F_{NO} = 4.66 \sim 5.20 \sim 5.74$
$f_B = 31.988 \sim 46.041 \sim 60.285$
$2\omega = 71.58° \sim 36.96° = 18.94°$

| | | | |
|---|---|---|---|
| $r_1 = \infty$ | $d_1 = 2.400$ | $n_{d1} = 1.84666$ | $\nu_{d1} = 23.78$ |
| $r_2 = 115.3975$ | $d_2 = 4.856$ | $n_{d2} = 1.69680$ | $\nu_{d2} = 55.53$ |
| $r_3 = -172.0825$ | $d_3 = 0.200$ | | |
| $r_4 = 49.7631$ | $d_4 = 3.810$ | $n_{d3} = 1.69680$ | $\nu_{d3} = 55.53$ |
| $r_5 = 111.1101$ | $d_5 = $ (Variable) | | |
| $r_6 = 78.9502$ | $d_6 = 1.200$ | $n_{d4} = 1.77250$ | $\nu_{d4} = 49.60$ |
| $r_7 = 16.1844$ | $d_7 = 6.586$ | | |
| $r_8 = -22.8810$ | $d_8 = 1.200$ | $n_{d5} = 1.75250$ | $\nu_{d5} = 49.60$ |
| $r_9 = 51.3956$ | $d_9 = 0.200$ | | |
| $r_{10} = 39.9198$ | $d_{10} = 2.484$ | $n_{d6} = 1.84666$ | $\nu_{d6} = 23.78$ |
| $r_{11} = -66.3029$ | $d_{11} = $ (Variable) | | |
| $r_{12} = \infty$ (Stop) | $d_{12} = 1.000$ | | |
| $r_{13} = 23.2661$ (Aspheric) | $d_{13} = 2.775$ | $n_{d7} = 1.60311$ | $\nu_{d7} = 60.70$ |
| $r_{14} = -240.7362$ | $d_{14} = 0.200$ | | |
| $r_{15} = 21.8362$ | $d_{15} = 2.674$ | $n_{d8} = 1.49700$ | $\nu_{d8} = 81.61$ |
| $r_{16} = 868.0450$ | $d_{16} = 2.241$ | | |
| $r_{17} = -20.5162$ | $d_{17} = 1.200$ | $n_{d9} = 1.80518$ | $\nu_{d9} = 25.43$ |
| $r_{18} = -127.4413$ | $d_{18} = $ (Variable) | | |
| $r_{19} = 45.4069$ | $d_{19} = 3.074$ | $n_{d10} = 1.67003$ | $\nu_{d10} = 47.25$ |
| $r_{20} = -28.7830$ | $d_{20} = 3.494$ | | |
| $r_{21} = 110.1787$ (Aspheric) | $d_{21} = 1.200$ | $n_{d11} = 1.78590$ | $\nu_{d11} = 44.19$ |
| $r_{22} = 20.1863$ | $d_{22} = 0.282$ | | |
| $r_{23} = 16.0292$ | $d_{23} = 1.992$ | $n_{d12} = 1.48749$ | $\nu_{d12} = 70.21$ |
| $r_{24} = 22.0705$ | | | |

Zooming Spaces

| f | 25.3 | 50.0 | 99.8 |
|---|---|---|---|
| $d_5$ | 1.0000 | 14.6940 | 31.3743 |
| $d_{11}$ | 18.9434 | 8.4253 | 1.3056 |
| $d_{18}$ | 4.3238 | 2.0731 | 1.000 |

Aspherical Coefficients

13th surface $A_4 = 0.14917 \times 10^{-4}$
$A_6 = 0.27749 \times 10^{-7}$
$A_8 = 0.87978 \times 10^{-9}$
$A_{10} = -0.39144 \times 10^{-11}$
$A_{12} = 0$

21th surface $A_4 = -0.69985 \times 10^{-4}$
$A_6 = -0.22036 \times 10^{-6}$
$A_8 = 0.14339 \times 10^{-8}$
$A_{10} = -0.22565 \times 10^{-10}$ $A_{12} = 0$
(1) $d_4/f_w = 0.14$
(2) $f_{12w}/f_T = -0.26$
(3) $A\Delta d_3 /f_w = 0.13$

Example 3

$f = 25.2 \sim 50.0 \sim 100.0$
$F_{NO} = 4.54 \sim 5.10 \sim 5.60$
$f_B = 33.312 \sim 45.988 \sim 61.636$
$2\omega = 72.10° \sim 37.26° \sim 19.02°$

| | | | |
|---|---|---|---|
| $r_1 = 60.6491$ | $d_1 = 2.000$ | $n_{d1} = 1.84666$ | $\nu_{d1} = 23.78$ |
| $r_2 = 40.3467$ | $d_2 = 4.492$ | $n_{d2} = 1.72916$ | $\nu_{d2} = 54.68$ |
| $r_3 = 497.0114$ | $d_3 =$ (Variable) | | |
| $r_4 = 254.4307$ | $d_4 = 1.200$ | $n_{d3} = 1.77250$ | $\nu_{d3} = 49.60$ |
| $r_5 = 18.1680$ | $d_5 = 7.248$ | | |
| $r_6 = -36.0691$ | $d_6 = 1.200$ | $n_{d4} = 1.77250$ | $\nu_{d4} = 49.60$ |
| $r_7 = 63.3487$ | $d_7 = 0.200$ | | |
| $r_8 = 41.5840$ | $d_8 = 2.734$ | $n_{d5} = 1.84666$ | $\nu_{d5} = 23.78$ |
| $r_9 = -120.0723$ | $d_9 =$ (Variable) | | |
| $r_{10} = \infty$ (Stop) | $d_{10} = 1.000$ | | |
| $r_{11} = 24.9215$ (Aspheric) | $d_{11} = 2.860$ | $n_{d6} = 1.51633$ | $\nu_{d6} = 64.15$ |
| $r_{12} = -617.6101$ | $d_{12} = 0.200$ | | |
| $r_{13} = 18.9826$ | $d_{13} = 3.052$ | $n_{d7} = 1.48749$ | $\nu_{d7} = 70.21$ |
| $r_{14} = 93.0258$ | $d_{14} = 3.146$ | | |
| $r_{15} = -18.9497$ | $d_{15} = 1.200$ | $n_{d8} = 1.84666$ | $\nu_{d8} = 23.78$ |
| $r_{16} = -56.1226$ | $d_{16} =$ (Variable) | | |
| $r_{17} = 31.0270$ | $d_{17} = 3.756$ | $n_{d9} = 1.65844$ | $\nu_{d9} = 50.86$ |
| $r_{18} = -29.3251$ | $d_{18} = 2.735$ | | |
| $r_{19} = -556.0150$ (Aspheric) | $d_{19} = 1.200$ | $n_{d10} = 1.77250$ | $\nu_{d10} = 49.60$ |
| $r_{20} = 32.9380$ | $d_{20} =$ (Variable) | | |
| $r_{21} = 49.0324$ | $d_{21} = 1.200$ | $n_{d11} = 1.51633$ | $\nu_{d11} = 64.15$ |
| $r_{22} = 37.1931$ | | | |

Zooming Spaces

| f | 25.2 | 50.0 | 100.8 |
|---|---|---|---|
| $d_3$ | 1.2000 | 13.4747 | 30.3865 |
| $d_9$ | 25.1511 | 10.3081 | 1.2783 |
| $d_{16}$ | 4.2768 | 2.0581 | 1.0000 |
| $d_{20}$ | 1.0000 | 3.2183 | 4.2776 |

Aspherical Coefficients

11th surface $A_4 = 0.21918 \times 10^{-4}$
$A_6 = -0.29023 \times 10^{-7}$
$A_8 = 0.44504 \times 10^{-5}$
$A_{10} = -0.59894 \times 10^{-10}$
$A_{12} = 0.31765 \times 10^{-12}$

19th surface $A_4 = -0.77374 \times 10^{-4}$
$A_6 = -0.12648 \times 10^{-6}$
$A_8 = -0.20680 \times 10^{-8}$
$A_{10} = 0.23110 \times 10^{-0}$
$A_{12} = -0.11142 \times 10^{-12}$
(1) $d_4/f_w = 0.11$
(2) $f_{12w}/f_T = -0.30$
(3) $A\Delta d_3 /f_w = 0.13$

Example 4

$f = 25.4 \sim 51.7 \sim 106.9$
$F_{NO} = 4.50 \sim 5.06 \sim 5.70$
$f_B = 34.854 \sim 49.843 \sim 61.773$
$2\omega = 72.01° \sim 35.93° \sim 17.69°$

| | | | |
|---|---|---|---|
| $r_1 = 247.0706$ | $d_1 = 2.400$ | $n_{d1} = 1.80518$ | $\nu_{d1} = 25.43$ |
| $r_2 = 74.0393$ | $d_2 = 4.216$ | $n_{d2} = 1.48749$ | $\nu_{d2} = 70.21$ |
| $r_3 = -184.0125$ | $d_3 = 0.200$ | | |
| $r_4 = 49.0559$ | $d_4 = 3.154$ | $n_{d3} = 1.72916$ | $\nu_{d3} = 54.68$ |
| $r_5 = 166.3259$ | $d_5 =$ (Variable) | | |
| $r_6 = 407.8742$ | $d_6 = 1.500$ | $n_{d4} = 1.77250$ | $\nu_{d4} = 49.60$ |
| $r_7 = 16.0577$ | $d_7 = 5.394$ | | |
| $r_8 = -28.1958$ | $d_8 = 1.200$ | $n_{d5} = 1.77250$ | $\nu_{d5} = 49.60$ |
| $r_9 = 54.9009$ | $d_9 = 0.200$ | | |
| $r_{10} = 37.5539$ | $d_{10} = 2.873$ | $n_{d6} = 1.84666$ | $\nu_{d6} = 23.78$ |
| $r_{11} = -78.6995$ | $d_{11} =$ (Variable) | | |
| $r_{12} = \infty$ (Stop) | $d_{12} = 0.800$ | | |

-continued

| | | | |
|---|---|---|---|
| $r_{13}$ = 38.1316 (Aspheric) | $d_{13}$ = 2.511 | $n_{d7}$ = 1.56016 | $\nu_{d7}$ = 60.30 |
| $r_{14}$ = −103.8484 | $d_{14}$ = 0.200 | | |
| $r_{15}$ = 22.4272 | $d_{15}$ = 2.680 | $n_{d8}$ = 1.48749 | $\nu_{d8}$ = 70.21 |
| $r_{16}$ = 431.8811 | $d_{16}$ = 2.118 | | |
| $r_{17}$ = −26.4421 | $d_{17}$ = 1.200 | $n_{d9}$ = 1.80518 | $\nu_{d9}$ = 25.43 |
| $r_{18}$ = −192.5764 | $d_{18}$ = (Variable) | | |
| $r_{19}$ = 31.9279 | $d_{19}$ = 3.431 | $n_{d10}$ = 1.60311 | $\nu_{d10}$ = 60.68 |
| $r_{20}$ = −36.8010 | $d_{20}$ = 7.027 | | |
| $r_{21}$ = ∞ (Aspheric) | $d_{21}$ = 1.212 | $n_{d11}$ = 1.79952 | $\nu_{d11}$ = 42.24 |
| $r_{22}$ = 43.9262 | | | |

| Zooming Spaces | | | |
|---|---|---|---|
| f | 25.4 | 51.7 | 106.9 |
| $d_5$ | 1.0000 | 13.9486 | 30.7176 |
| $d_{11}$ | 21.2889 | 9.6535 | 1.5000 |
| $d_{18}$ | 5.9891 | 2.6387 | 1.0000 |

Aspherical Coefficients

13th surface $A_1 = 0.83634 \times 10^{-5}$
$A_6 = 0.11592 \times 10^{-7}$
$A_8 = 0.68945 \times 10^{-10}$
$A_{10} = 0.47517 \times 10^{-12}$
$A_{12} = 0$ 21st surface $A_4 = -0.52001 \times 10^{-4}$
$A_6 = -0.15982 \times 10^{-6}$
$A_8 = 0.43993 \times 10^{-10}$
$A_{10} = -0.15466 \times 10^{-13}$
$A_{12} = 0$ (1) $d_4/f_w = 0.28$
(2) $f_{12w}/f_T = -0.24$
(3) $A\Delta d_3/f_w = 0.20$ According to the present invention as hereinbefore explained at great length, there is provided a positive lens group preceding type of zoom lens system including a second lens group having a negative refracting power and consisting of three lenses, wherein an aspheric surface or surfaces are effectively used whereby various aberrations introduced by increasing the refracting power of each lens group, so that while high optical properties are maintained, the number of lenses involved can be reduced to achieve cost reductions and compactness. In this zoom lens system, the focal distance at the wide-angle end is shorter than the diagonal length of the image pickup surface and the zoom ratio is at least 3, with well-corrected aberrations. Thus, the compact zoom lens system according to the present invention is suitable for use on still cameras.

What is claimed is:

1. A zoom lens system, in order from an object to an image side, comprising:

a first lens group having a positive power;
a second lens group having a negative power;
a third lens group having a positive power; and
a fourth lens group having a positive power,
wherein said first, second, third, and fourth lens groups are moved along an optical axis to effect zooming from a wide-angle end to a telephoto end such that all separations reserved between adjacent said lens groups vary during zooming,
said second lens group is comprised of less than four lenses,
said fourth lens group has at least a positive lens component and a negative lens component,
said third and fourth lens groups combined have at least two aspheric surfaces and are further characterized by conforming to the following conditional inequality:

$0.1 < d_4/f_w < 0.5$ where $d_4$ is an air separation length between the positive and negative lens components of said fourth lens group and $f_w$ is a composite focal distance of the zoom lens system at the wide-angle end, and wherein said first lens group, said third lens group and said fourth lens group are moved toward the object side during zooming from the wide-angle end to the telephoto end, while the position of said second lens group at the telephoto end is located on the object side relative to the position of said second lens group at the wide-angle end.

2. A zoom lens system according to claim 1, wherein the composite focal distance of the zoom lens system at the wide-angle end is shorter than a diagonal length of an image pickup surface.

3. A zoom lens system, in order from an object to an image side, comprising:

a first lens group having a positive power;
a second lens group having a negative power;
a third lens group having a positive power; and
a fourth lens group having a positive power,
wherein said first, second, third, and fourth lens groups are movably disposed along an optical axis to effect zooming from a wide-angle end to a telephoto end,
said second lens group is comprised of less than four lenses,
said fourth lens group has at least a positive lens component and a negative lens component,
said third and fourth lens groups combined have at least two aspheric surfaces and are further characterized by conforming to the following conditional inequality:

$$0.1 < d_4/f_W < 0.5$$

where $d_4$ is an air separation length between the positive and negative lens components of said fourth lens group and $f_W$ is a composite focal distance of the zoom lens system at the wide-angle end, and said third lens group comprises, in order from the object side, a positive lens, a positive lens and a negative lens.

4. A zoom lens system according to claim 3, wherein the composite focal distance of the zoom lens system at the wide-angle end is shorter than the diagonal length of an image pickup surface.

5. A zoom lens system according to claim 3, wherein said third lens group comprises, in order from the object side, a double-convex lens with a radius of curvature of an object-side surface thereof being smaller than that of an image-side surface thereof, a positive lens and a negative meniscus lens convex on the image side.

6. A zoom lens system, in order from an object to an image side, comprising:

a first lens group having a positive power;

a second lens group having a negative power;

a third lens group having a positive power; and a fourth lens group having a positive power, wherein said first, second, third, and fourth lens groups are movably disposed along an optical axis to effect zooming from a wide-angle end to a telephoto end, said second lens group is comprised of less than four lenses, said fourth lens group has at least a positive lens component and a negative lens component, said third and fourth lens groups combined have at least two aspheric surfaces and are further characterized by conforming to the following conditional inequality:

$$0.1 < d_4/f_W < 0.5$$

where $d_4$ is an air separation length between the positive and negative lens components of said fourth lens group and $f_W$ is a composite focal distance of the zoom lens system at the wide-angle end, and a lens of said third lens group proximate to the object side and a second lens of said fourth lens group as viewed from the object side have aspheric surfaces.

7. A zoom lens system according to claim 6, wherein the composite focal distance of the zoom lens system at the wide-angle end is shorter than a diagonal length of an image pickup surface.

8. A zoom lens system, in order from an object to an image side, comprising:

a first lens group having a positive power;

a second lens group having a negative power;

a third lens group having a positive power; and a fourth lens group having a positive power, wherein said first, second, third, and fourth lens groups are moved along an optical axis to effect zooming from a wide-angle end to a telephoto end such that all separations reserved between adjacent said lens groups vary during zooming, said second lens group is comprised of less than four lenses, said fourth lens group has at least a positive lens component and a negative lens component, said third and fourth lens groups combined have at least two aspheric surfaces and are further characterized by conforming to the following conditional inequality:

$$0.1 < d_4/f_W < 0.5$$

where $d_4$ is an air separation length between the positive and negative lens components of said fourth lens group and $f_W$ is a composite focal distance of the zoom lens system at the wide-angle end, and said first lens group and said second lens group are moved toward the object side as an integral piece for the purpose of focusing.

9. A zoom lens system according to claim 8, wherein the composite focal distance of the zoom lens system at the wide-angle end is shorter than a diagonal length of an image pickup surface.

10. A zoom lens system, in order from an object to an image side, comprising:

a first lens group having a positive power;

a second lens group having a negative power;

a third lens group having a positive power; and a fourth lens group having a positive power, wherein said first, second, third, and fourth lens groups are moved along an optical axis to effect zooming from a wide-angle end to a telephoto end such that all separations reserved between adjacent said lens groups vary during zooming, said second lens group is comprised of less than four lenses, said fourth lens group has at least a positive lens component and a negative lens component, said third and fourth lens groups combined have at least two aspheric surfaces and are further characterized by conforming to the following conditional inequality:

$$0.1 < d_4/f_W < 0.5$$

where $d_4$ is an air separation length between the positive and negative lens components of said fourth lens group and $f_W$ is a composite focal distance of the zoom lens system at the wide-angle end, and said third lens group comprises, in order from the object side, a positive lens, a positive lens and a negative lens.

11. A zoom lens system according to claim 10, wherein the composite focal distance of the zoom lens system at the wide-angle end is shorter than a diagonal length of an image pickup surface.

12. A zoom lens system according to claim 10 or 11, wherein said third lens group comprises, in order from the object side, a double-convex lens with a radius of curvature of an object-side surface thereof being smaller than that of an image-side surface thereof, a positive lens and a negative meniscus lens convex on the image side.

13. A zoom lens system, in order from an object to an image side, comprising:

a first lens group having a positive power;

a second lens group having a negative power;

a third lens group having a positive power; and a fourth lens group having a positive power, wherein said first, second, third, and fourth lens groups are moved along an optical axis to effect zooming from a wide-angle end to a telephoto end such that all separations reserved between adjacent said lens groups vary during zooming, said second lens group is comprised of less than four lenses, said fourth lens group has at least a positive lens component and a negative lens component, said third and fourth lens groups combined have at least two aspheric surfaces and are further characterized by conforming to the following conditional inequality:

$$0.1 < d_4/f_W < 0.5$$

where $d_4$ is an air separation length between the positive and negative lens components of said fourth lens group and $f_W$ is a composite focal distance of the zoom lens system at the wide-angle end, said fourth lens group has a positive lens component and a negative lens component in order from the object side, and said fourth lens group has, in order from the object side, a double-convex lens and a double-concave lens with a radius of curvature of an image-side surface thereof being smaller than that of an object-side surface thereof.

14. A zoom lens system according to claim 13, wherein the composite focal distance of the zoom lens system at the wide-angle end is shorter than a diagonal length of an image pickup surface.

15. A zoom lens system, in order from an object to an image side, comprising:

a first lens group having a positive power;

a second lens group having a negative power;

a third lens group having a positive power; and a fourth lens group having a positive power, wherein said first, second, third, and fourth lens groups are moved along an optical axis to effect zooming from a wide-angle end to a telephoto end such that all separations reserved between adjacent said lens groups vary during zooming, said second lens group is comprised of less than four lenses, said fourth lens group has at least a positive lens component and a negative lens component, said third and fourth lens groups combined have at least two aspheric surfaces and are further characterized by conforming to the following conditional inequality:

$$0.1 < d_4/f_W < 0.5$$

where $d_4$ is an air separation length between the positive and negative lens components of said fourth lens group and $f_W$ is a composite focal distance of the zoom lens system at the wide-angle end, said first lens group is comprised of less than four lenses, said third lens group is comprised of less than four lenses, and said fourth lens group is comprised of less than four lenses, and a lens of said third lens group proximate to the object side and a second lens of said fourth lens group as viewed from the object side have aspheric surfaces.

16. A zoom lens system according to claim 15, wherein the composite focal distance of the zoom lens system at the wide-angle end is shorter than a diagonal length of an image pickup surface.

* * * * *